US009242504B2

(12) United States Patent
Ikeda et al.

(10) Patent No.: US 9,242,504 B2
(45) Date of Patent: Jan. 26, 2016

(54) METHOD AND PRODUCT OF HYDRAULIC TRANSFER

(75) Inventors: Wataru Ikeda, Tokyo (JP); Yosuke Ono, Tokyo (JP)

(73) Assignee: TAICA CORPORATION, Tokyo (JP)

( * ) Notice: Subject to any disclaimer, the term of this patent is extended or adjusted under 35 U.S.C. 154(b) by 1043 days.

(21) Appl. No.: 13/386,214

(22) PCT Filed: Jul. 21, 2010

(86) PCT No.: PCT/JP2010/062227
§ 371 (c)(1),
(2), (4) Date: Jan. 20, 2012

(87) PCT Pub. No.: WO2011/010658
PCT Pub. Date: Jan. 27, 2011

(65) Prior Publication Data

US 2012/0111951 A1 May 10, 2012

(30) Foreign Application Priority Data

Jul. 23, 2009 (JP) ................................. 2009-172224

(51) Int. Cl.
*B44C 1/165* (2006.01)
*B44C 1/175* (2006.01)
*B29C 65/48* (2006.01)
(Continued)

(52) U.S. Cl.
CPC ............... *B44C 1/175* (2013.01); *B44C 1/1737* (2013.01)

(58) Field of Classification Search
USPC ................ 156/230, 240, 272.2, 273.3, 273.5, 156/275.5, 277, 289, 307.1, 307.4, 701, 703
See application file for complete search history.

(56) References Cited

U.S. PATENT DOCUMENTS 7,951,255 B2 5/2011 Ikeda et al.
8,178,187 B2 5/2012 Ikeda et al.
(Continued)

FOREIGN PATENT DOCUMENTS

JP 4329045 A 11/1992
JP 2002188030 A * 7/2002 ............. C09D 11/10
(Continued)

OTHER PUBLICATIONS

English Abstract of JP 2002-188030 (Mar. 31, 2015).*
(Continued)

*Primary Examiner* — Sing P Chan
(74) *Attorney, Agent, or Firm* — Pearne & Gordon LLP

(57) ABSTRACT

After applying an ultraviolet ray hardening resin composite 30 on a print pattern 22 of dry state and also permeating the resin composite through the print pattern to thereby reproduce the adhesion of the print pattern 22, the print pattern 22 is transferred under water pressure onto the surface of article 10 to form the decoration layer 22D on the surface of the article 10. Then, the preliminary irradiation of ultraviolet ray permeating only near the surface of this decoration layer 22D is performed to form a fine surface height variation portion 23 by shrinkage of ink in the surface of the ink printing portion of the decoration layer 22D. Thereafter, the complete irradiation of ultraviolet ray permeating through the total thickness of the decoration layer 22D is performed to completely harden the total thickness of the decoration layer 22D while maintaining the surface height variation portion 23. This enables the matting of the decoration layer in a controlled state without applying a topcoat.

4 Claims, 7 Drawing Sheets

(51) Int. Cl.

| | |
|---|---|
| ***B32B 37/14*** | (2006.01) |
| ***B32B 38/14*** | (2006.01) |
| ***B32B 43/00*** | (2006.01) |
| ***B44C 1/17*** | (2006.01) |

(56) References Cited

U.S. PATENT DOCUMENTS

| | | | | |
|---|---|---|---|---|
| 2004/0142115 | A1 * | 7/2004 | Jaworek et al. | 427/508 |
| 2007/0051458 | A1 | 3/2007 | Ikeda et al. | |
| 2007/0128662 | A1 * | 6/2007 | Isacoff et al. | 435/7.1 |
| 2007/0154685 | A1 | 7/2007 | Ikeda et al. | |
| 2008/0199664 | A1 | 8/2008 | Otaki et al. | |
| 2011/0189445 | A1 | 8/2011 | Takeuchi et al. | |

FOREIGN PATENT DOCUMENTS

| | | | |
|---|---|---|---|
| JP | 2004130778 | A | 4/2004 |
| JP | 2005169693 | A | 6/2005 |
| JP | 2005212340 | A | 8/2005 |
| JP | 2005224956 | A | 8/2005 |

OTHER PUBLICATIONS

Machine Translation of JP 2002-188030 (Jun. 16, 2015).*

* cited by examiner

METHOD AND PRODUCT OF HYDRAULIC TRANSFER

TECHNICAL FIELD

This invention relates to a method for transferring under water pressure a proper print patter on a surface of various articles while matting is controlled and a water pressure transfer article obtained by this method.

BACKGROUND OF THE INVENTION

In general, the water pressure transfer method is a method for supplying and floating on a surface of water flowing in a transfer tub a transfer film having a predetermined print pattern of non-water solubility applied on a water-soluble film of polyvinyl alcohol, making wet the water-soluble film of the transfer film with water, immersing an article (an object to be pattern-transferred) into the water in the transfer tub while contacting the transfer film, and transferring the print pattern of the transfer film onto the surface of the article using the water pressure to form a decoration layer.

The transfer film used for this water pressure transfer method is obtained by printing the print pattern on the water-soluble film by gravure printing method etc., but since this transfer film is kept in a dry state after the print pattern is formed, when the water pressure transfer should be performed, the ink of the print film is activated from the dry state to the state where it has an adhesion and thereafter the print pattern of the transfer film is transferred underwater in the state where the adhesion is reproduced.

The applicant has proposed a method of applying a non-solvent type ultraviolet ray hardening resin composite on the print pattern in order to activate the dried print pattern to permeate the non-solvent type ultraviolet ray hardening resin composite into the print pattern whereby an adhesion of the ink of the print pattern is reproduced by a photo-polymerization monomer of the non-solvent type ultraviolet ray hardening resin composite, transferring under water pressure the thus adhesion reproduced print pattern to a surface of an article and thereafter irradiating an ultraviolet ray onto the print pattern having the ultraviolet ray hardening resin composite permeated therein to harden the print pattern (see Patent Documents 1 through 3).

This method is advantageous because the print pattern is hardened and also a physically and chemically excellent characteristic is imparted to the print pattern by hardening the ultraviolet ray hardening resin composite permeated into the print pattern.

On the other hand, after the print pattern is transferred under water pressure onto the surface of the article, there have been tried various methods for matting a decoration layer formed by the print pattern. One of the methods is the method in which a topcoat layer is applied on the print pattern transferred under water pressure on the surface of the article to thereby matte the print pattern. However, this method is not preferable because two steps of water pressure transfer and application of the topcoat are required. Furthermore, since this method imparts the matting effect all over the surface of the print pattern, there cannot be imparted a partial matting in which the matting effect is applied only to the design (pattern) at its predetermined portions.

Another method is a method of blending a matting agent with the activating agent to thereby matte the print pattern together with the water pressure transfer of the print pattern. Although this method can carries out the matting together with the water pressure transfer, since this method presupposes the use of the conventional solvent type activator, this method cannot be applied to the case where the print pattern is activated by the ultraviolet ray hardening resin composite and it is disadvantageously difficult to adjust the state of matting control because the matting is controlled by the blend of the matting agent. Furthermore, in this method, the activator lies on the back of the design (pattern), that is between the article and the pattern, there is a problem that sufficient matting effect cannot be obtained.

Further method is disclosed in Patent Documents 4 and this method is a method for imparting a gloss, but not the matting effect. This method has two hardening steps. In the first hardening step, an unevenness is never produced on the surface by an irradiation of an activity energy ray as an irradiation amount of 40% or less, more particularly of 0.1 through 25% and the whole surface is hardened sufficiently not to leave water washing marks by removing a carrier film by water flush etc. to thereby obtain a feeling of gloss (see paragraph 0037 of Patent Document 4).

Another matting method is disclosed in Patent Document 5 and in this method, a rate of water absorption of the hardening resin formation layer is 0.5 $mg/cm^2$ or more and activity energy ray of 1% or more of the amount of irradiation required for a complete hardening is irradiated just after a print layer is transferred onto an object to be transferred whereby the matting effect can be imparted without the blend of any matting agent (see paragraphs 0009 through 0012 of Patent Document 5).

However, since the methods disclosed in Patent Documents 4 and 5 were the method in which the matting effect was imparted all over the surface, the matting could not be controlled so as to partially matte the design at predetermined portions. Furthermore, these methods substantially differ from an idea of obtaining the matting effect by forming fine wrinkles on the design surface.

On the other hand, in the method of irradiating the ultraviolet ray onto the print pattern having the ultraviolet ray hardening resin composite permeated as disclosed in Patent Documents 1 through 3, in case where the water pressure transfer is performed mainly on a three-dimensional article, an ultraviolet ray is irradiated all over the surface of the article for hardening the print pattern by the irradiation of the ultraviolet ray. Especially, in the technical art of forming fine wrinkles (fine unevenness) on the design surface to produce a gloss difference, since formation of these fine wrinkles utilizes the hardening shrinkage by the irradiation of the ultraviolet ray, when the water pressure transfer is performed on the three-dimensional object, there occurs an uneven formation of the wrinkles by the hardening shrinkage unless the ultraviolet ray is irradiated with the irradiation amount and the irradiation time of ultraviolet ray very strictly set. As a result, there is totally arranged no gloss difference, which causes a gloss non-uniformity to occur at all the portions of the three-dimensional article and therefore the stable matting design cannot be obtained. The non-uniformity of formation of wrinkles is especially remarkable in the case where the irradiation amount and the irradiation time of the ultraviolet ray greatly differs on the forward and backward faces of the conveyance direction of the three-dimensional article, such as the case where the ultraviolet ray is irradiated while the article is conveyed by an automatic conveyor used for a mass-production line.

PRIOR ART DOCUMENTS

Patent Documents

Patent Document 1 Japanese Patent No. 3,806,737
Patent Document 2 Japanese Patent No. 3,881,002

Patent Document 3 Japanese Patent No. 4,166,816
Patent Document 4 JP2004-130778A
Patent Document 5 JA 2005-212340A

SUMMARY OF THE INVENTION

Problems to be Solved by the Invention

A first problem to be solved by this invention is to provide a water pressure transfer method adapted to perform a matting together with a water pressure transfer of a decoration layer formed by transferring under water pressure a print pattern onto a surface of an article without any requirement of use of a topcoat and to be able to control the matting effect at predetermined portions or all surfaces of the article.

A second problem to be solved by the invention is to provide a water pressure transfer article having a controlled matting on a surface of a decoration layer formed by transferring under water presser a print pattern onto a surface of an article.

In order to solve the these problems, the applicant further has advanced the research of the matting method in viewpoint of productivity and quality stability paying an attention to the method disclosed in Patent Document 2 in which the matting effect can be obtained by irradiating ultraviolet ray on the print pattern into which ultraviolet ray hardening resin composite is permeated to thereby form a partial fine unevenness on the print pattern as previously proposed by the applicant as the conventional matting method using no matting agent.

In order to promote the hardening of the decoration layer in the course of this research, it has been observed that when the irradiation of ultraviolet ray is excessively strengthened, it is hard to form the partial fine unevenness of the print pattern whereby there occurs a phenomenon in which a desired matting effect can be no longer obtained. It has been observed that if the decoration layer is hardened through an equipment of simplest structure for irradiating ultraviolet ray of a single condition with an ultraviolet ray irradiation apparatus located at a fixed position while transporting the article in a single axial direction on a conveyor belt, a uniform matting effect can be obtained at desired portions of the article, which is like a board, but no matting effect can be obtained on the rear side face of the article having a decoration face on a side face of thickness such as a cuboid among the faces thereof excluding the face contacting the belt conveyor because the ultraviolet ray is irradiated latest on the rear side face of the article. On the contrary, if the irradiation of ultraviolet ray is totally strengthened so that the matting effect might be obtained also on the rear side face, it is observed that the gloss on the side of the front side face disappears.

When the cause of these resultant observations is analyzed, it has been discovered that the hardening state near the surface of the decoration layer is closely related to the condition of ultraviolet ray irradiation at the first stage of irradiation in the course of forming partial fine unevenness of the print pattern contributing to the appearance of the matting effect. This invention has been completed on such a discovery.

Means to Solve the Problems

Means to solve a first problem of the invention is to provide a method for reproducing an adhesion of a dried print pattern by coating an ultraviolet ray hardening resin composite including photo-polymerization monomer to permeate said ultraviolet ray hardening resin composite into said print pattern; thereafter transferring said print pattern under water pressure onto a surface of an article to form a decoration layer and then irradiating an ultraviolet ray on said decoration layer to harden said decoration layer and at the same time form fine unevenness due to variation in shrinkage on the ink print portion of said decoration layer, characterized by further comprising the steps of performing a preliminary irradiation of an ultraviolet ray permeating only through the portion near the surface of said decoration layer before said decoration is hardened (referred to as ultraviolet ray for preliminary irradiation later) to form a fine surface height variation portion due to the shrinkage of ink on the surface of said ink print portion of said decoration layer; and thereafter performing a complete irradiation of ultraviolet ray permeating through the whole thickness of said decoration layer (referred to as ultraviolet ray for complete irradiation later) to completely harden the whole thickness of said decoration layer while said surface height variation portion is maintained.

In the means to solve the first problem, the ultraviolet ray for preliminary irradiation forms and fixes fine unevenness due to shrinkage variation only on a surface layer portion of the ink print portion of the decoration layer receiving this preliminary irradiation and the layer portion inside the surface layer portion is maintained at a non-hardening state (a hardening state lower than that of the surface layer portion and including a state of semi-hardening so as not to prevent the formation of the fine unevenness due to the previous shrinkage variation only on the surface layer portion) whereby there is provided a ground to easily form the fine unevenness without damaging an action of shrinking the surface. Next, the ultraviolet ray for complete irradiation serves to harden the whole decoration layer while maintaining the height of the fine unevenness formed by the preliminary irradiation. The height of the fine unevenness can be controlled by irradiating the ultraviolet ray for preliminary irradiation while adjusting a quantity of ultraviolet ray irradiated on the predetermined portions or all the surface of the decoration layer whereby the delicate matting effect of various designs can be imparted to the decoration layer.

The characteristic of the matting effect of the invention is to control the surface state of the decoration layer formed by transferring under water pressure the print pattern on the surface of the article and more concretely to impart gloss variation of a high gloss pattern portion and a low gloss pattern portion adjacent to each other on the ink print portion of the decoration layer. Desirably, the low gloss pattern portion has a gloss degree of less than 20 measured based on Japanese Industrial Standards Z8741-1997 "method 3-60-degree specular surface gloss" and the difference of gloss degree between the high gloss pattern portion and the low gloss pattern portion has a gloss degree of 10 or more measured based on Japanese Industrial Standards Z8741-1997 "method 3-60-degree specular surface gloss".

A presumed mechanism of appearance of the matting effect based on the fine unevenness formation according to the invention will be described herein-below. As an ultraviolet ray hardening resin composite is applied to the print pattern in order to make the print pattern wet, the ultraviolet ray hardening resin composite permeates the ink printing portion so that the print pattern and the ultraviolet ray hardening resin composite are wholly integrated with each other while changing the amount of permeation of the ultraviolet ray hardening resin composite according to the oil absorption of the ink pigments of the print pattern and the concentration of the ink and thus, as an ultraviolet ray is irradiated on the ultraviolet ray hardening resin composite integrated with the print pattern, a fine unevenness based on the hardening shrinkage of the ink is formed on the surface of the ink printing portion according to the degree (the amount) of permeation of the ultraviolet ray hardening resin composite whereby the surface matting effect appears, which is the action of the prior art and in addition thereto, it has been found that the ultraviolet-ray permeability of the decoration layer which is a technical element of the invention, i.e., the ultraviolet-ray permeability of the ink pigments deeply takes a part in the formation of the fine unevenness which generates the matting. Namely, as the ultraviolet-ray permeability of the ink pigments is lower, the hardening depth is shallower in comparison with the case where the ultraviolet ray permeability of the ink pigments is higher and a hardened layer is formed only on a surface portion while the internal portion is in a state of being not still hardened. Thus, the hardened layer of the surface easily shrunk whereby the fine unevenness is formed and a unique matting effect appears through subsequent internal hardening. If the ultraviolet ray permeability is lower, the ultraviolet-ray attenuates more early while the ultraviolet ray permeates through the portion near the surface of the decoration layer in comparison with the case where the ultraviolet ray permeability is higher and therefore the permeation depth of the ultraviolet ray is smaller and the hardening depth is shallower. If the ultraviolet ray permeability is higher, the ultraviolet ray will advance deeply before the ultraviolet ray declines, the hardening depth gets deeper and the internal hardening can be accomplished.

In view of the oil absorption of the ink pigments and the ink concentration, as the amount of permeation of the ultraviolet ray hardening resin composite into the ink is larger, the amount of shrinkage of the ink when it is hardened gets larger. Thus, there is formed the fine unevenness on the decoration layer and it is observed that a gloss feeling of the decoration layer is reduced to thereby provide a low gloss pattern portion to the decoration layer and also to form a convex area due to the hardening in a state of absorption of the ultraviolet ray hardening resin composite. On the other hand, as the amount of permeation of the ultraviolet ray hardening resin composite into the ink is smaller, the fine unevenness is less generated to thereby provide a high gloss pattern portion which causes a higher gloss feeing to be observed and also to form a concave area having the height relatively lower than the height of the convex area due to the hardening in a state of less absorption of the ultraviolet ray hardening resin composite. The difference between these gloss feelings occurs adjacent to each other on the decoration layer in accordance with the print pattern. In the specification, what is meant by the "ink concentration" is a ratio of inclusion of pigments among the ink component of the resin and the pigments".

In the range of the preliminary irradiation conditions, the ultraviolet ray hardening resin composite for obtaining the good matting effect essentially includes (1) photo-polymerization pre-polymer, (2) photo-polymerization monomer and (3) photo-polymerization initiator. The photo-polymerization pre-polymer may be either one of acrylic oligomer, polyester oligomer, epoxy acrylate oligomer, urethane acrylate oligomer, etc. or an arbitrary combination of two or more of them. The photo-polymerization monomer serves to dilute the photo-polymerization pre-polymer so as to assure the practical operation effectiveness of the resin composite and also performs the polymerization of itself when the ultraviolet ray is irradiated thereon. In the water pressure transfer method, the photo-polymerization monomer also serves as a functioning component (an ink dissolving component) for reproducing the adhesion of the print pattern in the dry state. The photo-polymerization monomer may be either of a single functional monomer and a multi-functional monomer in accordance with the characteristic thereof. Since the photo-polymerization monomer which is a non-solvent activating component of the ultraviolet ray hardening resin composite reproduces the adhesion of the print pattern of the transfer film in a good manner, the ultraviolet ray hardening resin composite may be preferably of a non-solvent type having no solvent contained such as thinner or alcohol, but it may contain a solvent component as a secondary ingredient which has no purpose of the ink solubility of the print pattern.

In the means to solve the first problem of the invention, the ultraviolet ray for the preliminary irradiation may be the low permeability ultraviolet ray of 200 nm or more and less than 320 nm and the preliminary irradiation according to the ultraviolet ray may be performed under the conditions where the peak intensity (Ip) [mW/cm$^2$]) and the integrated quantity of light (E) [mJ/cm$^2$]) meet the following expression 1. If it falls out of these conditions, then the desired matting effect cannot be obtained.

$$60E^{-1.4} <= Ip <= 5765E^{-1.85} \qquad \text{(Expression 1)}$$

(In the expression 1, E>0, Ip>0)

What is meant by "low permeability" is the characteristic of the portion of the decoration layer near the surface thereof being selectively hardened, but the inner portion of the decoration layer being not hardened or half-hardened because the amount of the ultraviolet ray declines due to the hardening reaction near the surface of the decoration layer and as a result the ultraviolet ray cannot sufficiently reaches the inner portion of the decoration layer. In other words, it means the characteristic in which the shallow portion of the decoration layer is hardened, but the deep portion thereof cannot be hardened. The expression 1 is provided by finding and formulating the range within which the desired matting effect is obtained by means of the verification based on the experiment on the relation between the conditions of the peak intensity (Ip) [mW/cm$^2$]) and the integrated quantity of light (E) [mJ/cm$^2$]) and the matting effect of the invention.

The preliminary irradiation may be performed preferably in the state of satisfying the conditions of the peak intensity (Ip) of 0.5 or more [mW/cm$^2$] and 6 or less [mW/cm$^2$] and of the integrated quantity of light of 5 or more [mJ/cm$^2$] and 120 or less [mJ/cm$^2$]. The preferred preliminary irradiation may be appropriately performed using a high pressure mercury lamp to irradiate the ultraviolet ray of low permeability comparatively. As the peak intensity of the ultraviolet ray falls within the above range, the stable matting effect can be obtained, but the peal intensity and the integrated quantity of light are out of the above ranges, the sufficient matting effect is undesirably hard to be obtained. Especially, in the case where the ink printing portion of the decoration layer is of black ink, these conditions are most suitable for obtaining the good matting effect.

In the means to solve the first problem of the invention, the ultraviolet ray for the complete irradiation may be the high permeability ultraviolet ray of 320 nm or more and less than 390 nm and the complete irradiation of the ultraviolet ray may be preferably performed under the conditions where the peak intensity (Ip) of 200 or more [mW/cm$^2$] and 400 or less [mW/cm$^2$] and the integrated quantity of light (E) of 1000 or more [mJ/cm$^2$]) and 4000 or less [mJ/cm$^2$]. This preferable irradiation may be performed using an A type metal halide lamp to irradiate the high permeability ultraviolet ray.

What is meant by the "high permeability" is a characteristic of hardening the whole decoration layer with the ultraviolet ray of the amount sufficient to harden the inner portion of the decoration layer reaching the inner portion thereof or permeating through the back face of the decoration layer to thereby harden the whole decoration layer.

As the peak intensity and the integrated quantity of light of the ultraviolet ray for the complete irradiation fall within the above ranges, the decoration layer can be hardened while the fine unevenness of the decoration layer formed by the preliminary irradiation is maintained and therefore, the matting effect of the invention can be accomplished while keeping the good physical properties of the hardened film (close adhesion, abrasion resistance, etc.). If the range of the peak intensity and the integrated quantity of light of the ultraviolet ray for the complete irradiation are less than the above lower limit values, the decoration layer cannot be fully hardened and cannot maintain the physical properties (physical strength and durability etc.) of the hardened film. If the range of the peak intensity and the integrated quantity of light of the ultraviolet ray for the complete irradiation exceed the upper limit values, the pattern-transferred article, especially the article of resin undesirably tends to produce faults such as yellowing.

The means to solve the second problem of the invention is to provide a water pressure transfer article having the decoration layer formed by the means to solve the first problem.

Effect of the Invention

In accordance with the invention, the adhesion of the dried print pattern by using the ultraviolet ray hardening resin composite is reproduced and thereafter the print pattern is transferred under water pressure on the surface of the article to form the decoration layer, the preliminary irradiation of the ultraviolet ray permeating only through the portion near the surface of the ink printing portion of the print pattern is performed using the ultraviolet bray hardening resin composite permeated into and mixed with the print pattern to form the fine surface height variation portion due to the shrinkage of the ink on the surface of the ink print portion of the decoration layer, and thereafter the complete irradiation of ultraviolet ray permeated through the whole thickness of the decoration layer s performed to thereby completely harden the whole thickness of the decoration layer while the surface height variation portion is maintained. As a result, a separate step of operation such as an application of topcoat etc. is not required. The ultraviolet ray for the preliminary irradiation firstly forms and fixes the fine unevenness due to variation in shrinkage by adjusting the peak intensity and the integrated quantity of light to thereby adjust the irradiation and the penetration depth thereof and the inner layer portion has the not-hardened state maintained without damaging the surface shrinkage action to form a ground on which the fine unevenness tends to be easily formed. Thus, the height of the surface height variation portion can be easily controlled by the peak intensity and the integrated quantity of light of the ultraviolet ray for the preliminary irradiation. On the other hand, since the ultraviolet ray for the complete irradiation can harden the whole decoration layer while maintaining the height of the fine unevenness formed by the ultraviolet ray for the preliminary irradiation, the water pressure transfer article having the delicate matting effect imparting various designs can be easily obtained.

Even in the case where the decoration layer integrally containing the ultraviolet ray hardening resin composite is hardened with the equipment of the simplest construction fixedly positioned for carrying out the ultraviolet ray irradiation in a single condition by means of the ultraviolet ray irradiation apparatus while conveying the article having the decorative face on the side face of the rectangular parallelepiped, etc. in a single axial direction on a conveyor belt, a local hardening hardly advances if the preliminary irradiation is performed under the aforementioned conditions, and the fine unevenness can be formed only near the surface of the decoration layer in a generally uniform manner all over the whole face of the article before the complete irradiation. Thus, the uniform matting effect can be obtained by the equipment of simple structure without using peculiar equipment for the aforementioned three-dimensional article and there can be provided the water pressure transfer article having the matting effect imparted to the article of various shape in a stable and reasonable manner.

BRIEF DESCRIPTION OF THE DRAWINGS

FIG. 1 shows one form of the water pressure transfer method of the invention sequentially in order of steps of operation wherein FIG. 1A is a sectional view of a transfer film, FIG. 1B is a sectional view of the state where an ultraviolet ray hardening resin composite permeates into the transfer film, FIG. 1C is a sectional view of the state where the transfer film of FIG. 1A is floated on a surface of water and just before the article to be transferred is pushed into the water, FIG. 1D is a sectional view of the state where an ultraviolet ray is preliminary irradiated on the article after the water pressure transfer is performed, FIG. 1E is a sectional view of the state where an ultraviolet ray is completely irradiated on the article, FIG. 1F is a sectional view of the state where a water-soluble film is washed out from the article and FIG. 1G is a sectional view of the state where the surface of the article is dried.

FIG. 2 shows the cross section of an ink printing portion of the decoration layer in an enlarged manner wherein FIG. 2A is a sectional view of the ink printing portion before the ultraviolet ray irradiation, FIG. 2B is a sectional view of the ink printing portion when a preliminary irradiation of the ultraviolet ray is performed and FIG. 2C is a sectional view of the ink printing portion when a complete irradiation of the ultraviolet ray is performed;

BEST MODE OF EXAMPLE OF INVENTION

Figure 1:
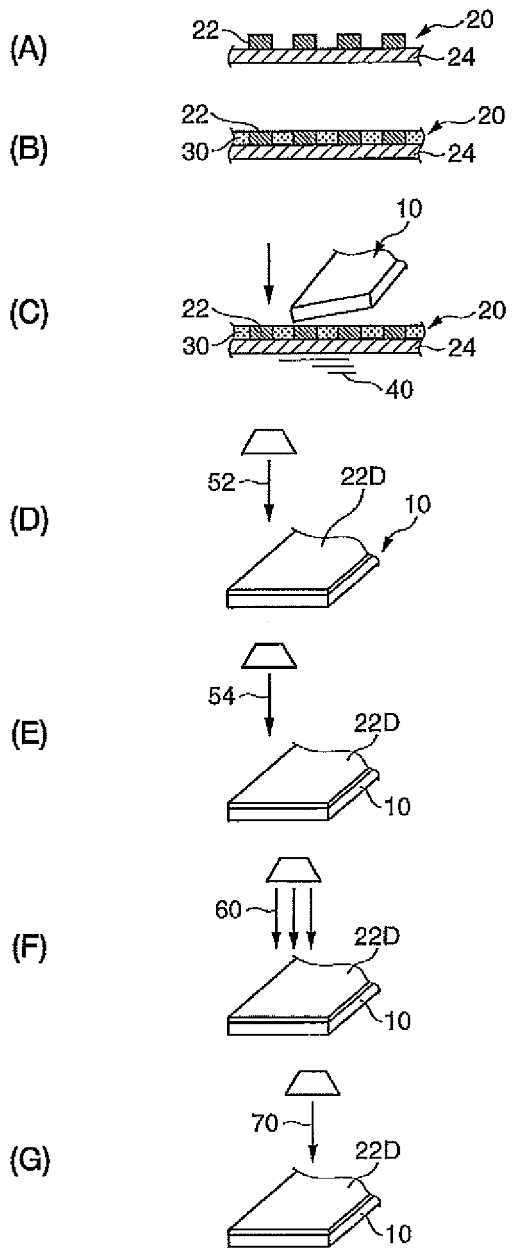
Figure 2:
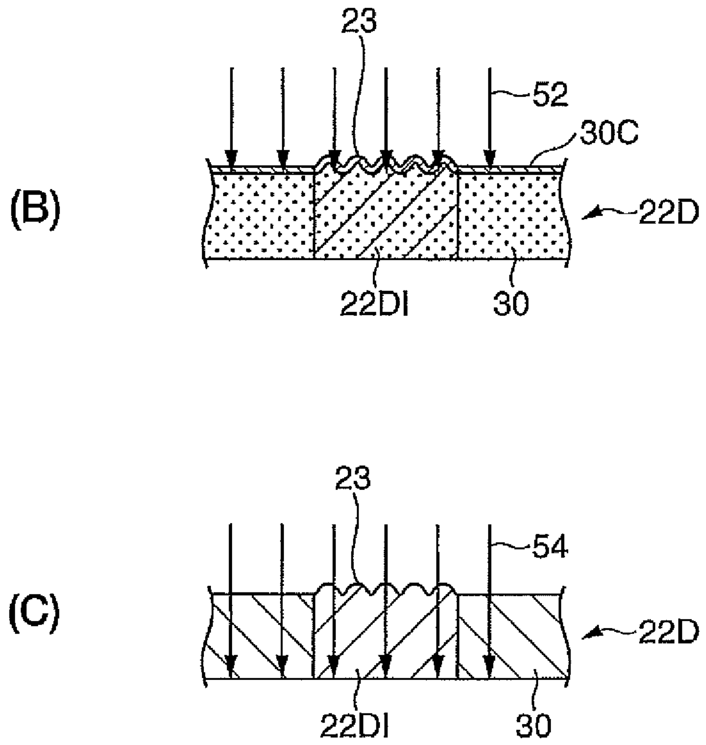
Figure 4:
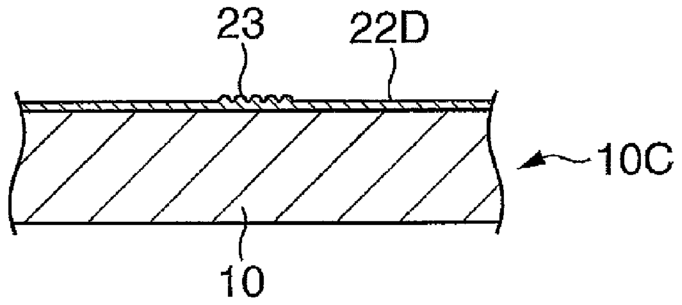
FIG. 4 is a sectional view of the water pressure transfer article obtained by the method of the invention.

Referring to a mode of embodiment of the invention in details with reference to the drawings, a water pressure transfer method to which this invention is applied is a method in which a transfer film 20 comprising a water-soluble film (a carrier film) 24 having a print pattern 22 applied thereto is floated on a water 40 within a transfer tub not shown with the print pattern 22 directed upside as shown in FIG. 1A and an article 10 to be transferred under water pressure is pushed down underwater through the transfer film 20 as shown in FIG. 1C whereby the print pattern 22 is transferred onto the surface of the article 10 using the water pressure generated by the pushing down to thereby form a decoration layer 22D (see FIG. 2 and FIG. 4). This method itself is a well-known art.

The water soluble film 24 is softened by absorbing the water and being made wet. This water-soluble film 24 may be formed of water-soluble material having a main ingredient of polyvinyl alcohol, for example. This water soluble film 24 gets wet when it contacts the water within the transfer tub to facilitate the water pressure transfer. The print pattern 22 may be printed on the water soluble film 24 by gravure printing, ink jet printing and so on.

In the method of the invention, as shown in FIG. 1B, an ultraviolet ray hardening resin composite including photo-polymerization monomer is applied to and permeated into the print pattern 22 in the dry state shown in FIG. 1A to reproduce the adhesion of the print pattern 22, then as shown in FIG. 1C, the print pattern 22 is transferred under water pressure on the surface of the article 10 to thereby form the decoration layer 22D on the surface of the article 10. Thereafter, as shown in FIGS. 1D and 1E, the ultraviolet ray is irradiated on the decoration layer 22D in the predetermined conditions described later in a divided manner of two steps (preliminary step and complete step), the water soluble film 24 (omitted and not shown in FIGS. 1D, 1E and 1F) is washed out by water shower 60 as shown in FIG. 1F and further as shown in FIG. 1G, it is dried by hot wind 70 whereby the water pressure transfer article having the decoration layer 22D matted is completed. In FIG. 1B, the ultraviolet ray hardening resin composite 30 is not shown on the ink printing portion (the raised portion of FIG. 1A, that is the portion shown by a reference numeral 22DI in FIGS. 2A and 2B) of the print pattern 22, but this is why the ultraviolet ray hardening resin composite permeates into the ink printing portion of the print pattern 22. In FIGS. 2A and 2B, the state in which the ultraviolet ray hardening resin composite 30 permeates is shown in a dot-like state.

The irradiation of the preliminary step (referred to as preliminary irradiation later) among the two irradiation steps of ultraviolet ray is to irradiate the ultraviolet ray the low permeability ultraviolet ray 52 penetrating only near the surface of the decoration layer 22D before the decoration layer 22D is hardened as shown in FIG. 1D and this preliminary irradiation forms the surface hardened layer 30C including the fine surface height variation portion 23 on the surface of the ink printing portion 22DI of the decoration layer 22D due to the shrinkage of the ink, as shown in FIG. 2B. The surface height variation portion 23 has the height controlled by the irradiation conditions of the preliminary irradiation of ultraviolet ray, but the details thereof will be described later. The portions other than the surface height variation portion 23 among the surface hardened layer 30C is the surface hardened layer portions of ultraviolet ray hardening resin composite 30 filled up between the adjacent ink printing portions 22DI. Although only one of the ink printing portions 22DI is shown by FIG. 2B, in practice, if the print pattern is "a wood grain pattern", for example, since the amount of absorption of ultraviolet ray differs according to the characteristic (quality) such as the oil absorption of ink pigments or the ink concentration between the ink printing portions 22DI, the height of the fine surface height variation portions 23 due to shrinkage of ink naturally changes. It should be noted that there is simply shown in FIG. 2B only one of the surface height variation portion 23 having the predetermined height defined according to the characteristic of ink pigments.

Figure 8:
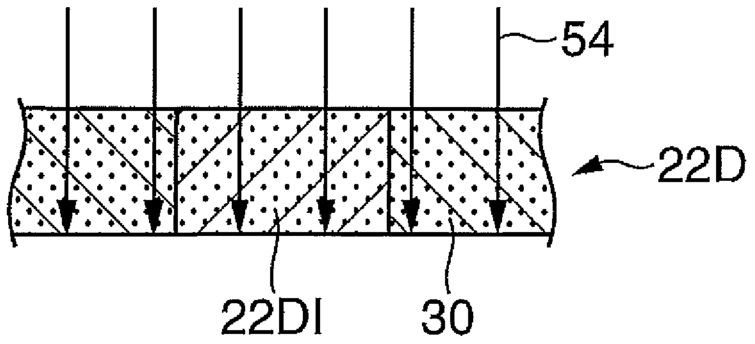
FIG. 8 is a sectional view of the decoration layer hardened only by the complete irradiation without performing the preliminary irradiation unlike the method of the invention.

The irradiation of the complete step (referred to as complete irradiation later) is to irradiate the ultraviolet ray 54 penetrating through the total thickness of the decoration layer 23 as shown in FIG. 1E and this complete irradiation completely hardens the total thickness of the decoration layer 23 while maintaining the surface height variation portion 23 of the decoration layer 22D as shown in FIG. 2C. 1E. If, unlike the invention, only the high permeability ultraviolet ray is irradiated by omitting the preliminary irradiation (that is only the complete irradiation is performed) as shown in FIG. 8, there is formed no surface height variation portion 23 due to shrinkage of ink or there is formed the height variation never visually recognized, namely never providing the desired matting effect although not illustrated in the drawings when the total thickness of the decoration layer 22D is completely hardened, which never obtains the desired matting effect.

The ultraviolet ray 52 for the preliminary irradiation may be the low permeability ultraviolet ray of 200 nm or more and less than 320 nm and the preliminary irradiation of the ultraviolet ray may be performed under the conditions where the peak intensity (Ip) [mW/cm$^2$]) and the integrated quantity of light (E) [mJ/cm$^2$]) meet the following expression 1.

$$60E^{-1.4} <= Ip <= 5765E^{-1.85} \qquad \text{(Expression 1)}$$

(In the expression 1, E>0, Ip>0)

Particularly, the preliminary irradiation of the low permeability ultraviolet ray 52 may be preferably formed in the conditions of the peak intensity of 0.5 or more and 6 or less and the integrated quantity of light of 5 or more and 120 or less among the aforementioned irradiation conditions.

Figure 3:
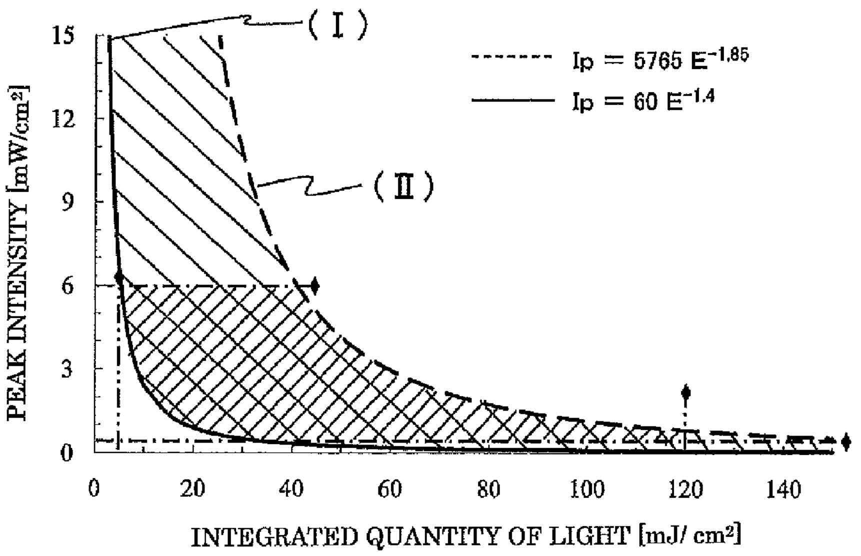
FIG. 3 is a graph showing ranges of irradiation conditions based on the peak intensity and the integrated quantity of light on the preliminary irradiation of ultraviolet ray.

The area of the ultraviolet ray preliminary irradiation meeting the expression 1 is an area between boundary condition curves (I) and (II) of FIG. 3. The reason why the conditions of the ultraviolet ray preliminary irradiation are set as aforementioned is that the good matting effect of the decoration layer 22D cannot be obtained if the conditions thereof are out of the aforementioned ones, as a result of various trials. Although the details will be explained later with reference to some concrete Examples, an upper shadowed area of FIG. 3 shows the irradiation conditions of the ultraviolet ray when the desirable matting result is obtained. The more preferable area of the aforementioned preliminary irradiation described in the preceding paragraph is a lower area where lattice-shaped oblique lines are drawn in FIG. 3. The preliminary irradiation is appropriately performed using the high pressure mercury lamp for irradiating the comparatively low permeability ultraviolet ray.

Figure 7:
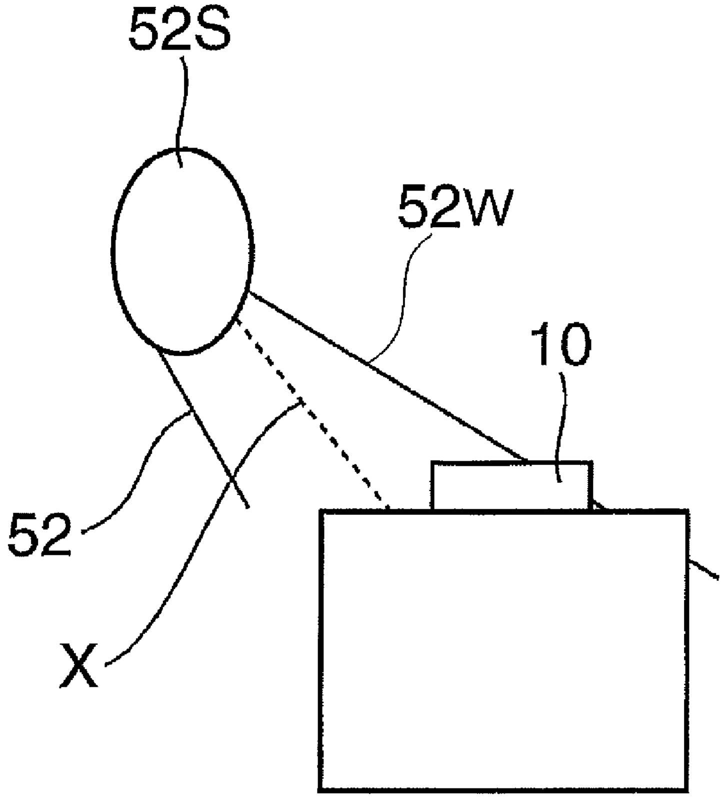
FIG. 7 shows a relationship of positions of a light source and the irradiated article as an example of a method of the preliminary irradiation of ultraviolet ray.

If the irradiation can be performed so as to meet the aforementioned conditions, the method of the preliminary irradiation is not limited in particular, but the irradiation intensity of the light source (the high pressure mercury lamp) may be adjusted or as shown in FIG. 7, the light source 52S is arranged so that an optical axis X of the light source 52S for the preliminary irradiation may be intentionally out of the irradiated article 10 whereby a weak light 52*w* in the peripheral portion of the light source 52 is irradiated upon the irradiated article 10.

The ultraviolet ray 54 for the complete irradiation may be the high permeability ultraviolet ray of 320 nm or more and less than 390 nm and the complete irradiation of the ultraviolet ray may be preferably performed under the conditions where the peak intensity (Ip) of 200 or more [mW/cm$^2$] and 400 or less [mW/cm$^2$] and the integrated quantity of light (E) of 1000 or more [mJ/cm$^2$]) and 4000 or less [mJ/cm$^2$] are met. The ultraviolet ray meeting these conditions is irradiated on the decoration layer 22D, the ultraviolet ray permeates through the total thickness (usually 10-20 micrometers) of the decoration layer 22D to thereby completely harden the decoration layer 22D. This complete irradiation may be appropriately performed using the A type metal halide lamp for irradiating the high permeability ultraviolet ray.

As noted from the area of ultraviolet ray preliminary irradiation of FIG. 3, as the peak intensity Ip of the ultraviolet ray is higher, it will be required to make the integrated quantity of light E lower and as noted from the especially preferred area shown by the lower lattice-like oblique lines of FIG. 3, it is desirable to make the peak intensity Ip lower while the integrated quantity of light is made larger. Although the surface height variation portion 23 has a proper height variation provided by adjusting the ultraviolet ray irradiation conditions, in general, as the peak intensity is made higher and as the integrated quantity of light is larger, there can be provided the larger height variation. As already explained, the height of the height variation portion 23 differs in accordance with the characteristic of ink pigments, but the above explanation is made in which the height of the surface height variation portion of the decoration layer can be controlled by the irradiation conditions of the ultraviolet ray for the preliminary irradiation in the case where the ink having the ink pigments of the same characteristics is used. This means that the different height can be obtained at the different place in accordance with the irradiation conditions of the ultraviolet ray for the preliminary irradiation even if the ink has the ink pigments of the same characteristics.

EXAMPLES

Table 1 shows the preliminary irradiation conditions, the complete irradiation and the evaluation symbols of the matting effect of Examples 1-29, and Table 2 shows the preliminary irradiation conditions, the complete irradiation conditions and the evaluation symbols of the matting effect in Comparisons 1-18.

TABLE 1

| | Preliminary Irradiation Conditions | | Complete Irradiation Conditions | | Matting Effect | |
|---|---|---|---|---|---|---|
| | Integrated Quantity of Light (E) mJ/cm$^2$ | Peak Intensity (Ip) mW/cm$^2$ | Integrated Quantity of Light (E1) mJ/cm$^2$ | Peak Intensity (Ip1) mW/cm$^2$ | Board-like article | 3D article |
| Example 1 | 100 | 1 | 2300 | 300 | ◎ | ○ |
| Example 2 | 75 | 1.64 | 2300 | 300 | ◎ | ◎ |
| Example 3 | 45 | 4.8 | 2300 | 300 | ◎ | ◎ |
| Example 4 | 25 | 2 | 2300 | 300 | ◎ | ◎ |
| Example 5 | 60 | 2 | 2300 | 300 | ◎ | ◎ |
| Example 6 | 15 | 4 | 2300 | 300 | ◎ | ◎ |
| Example 7 | 45 | 2 | 2300 | 300 | ◎ | ◎ |
| Example 8 | 90 | 0.7 | 2300 | 300 | ◎ | ◎ |
| Example 9 | 11 | 5.5 | 2300 | 300 | ◎ | ◎ |
| Example 10 | 35 | 5.5 | 2300 | 300 | ◎ | ◎ |
| Example 11 | 25 | 5.1 | 2300 | 300 | ◎ | ◎ |
| Example 12 | 119 | 0.6 | 2300 | 300 | ◎ | ◎ |
| Example 13 | 6 | 5.84 | 2300 | 300 | ◎ | ◎ |
| Example 14 | 9 | 3.45 | 2300 | 300 | ◎ | ◎ |
| Example 15 | 16 | 1.63 | 2300 | 300 | ◎ | ◎ |
| Example 16 | 29 | 0.75 | 2300 | 300 | ◎ | ◎ |
| Example 17 | 125 | 0.6 | 2300 | 300 | ○ | ○ |
| Example 18 | 35 | 7.93 | 2300 | 300 | ○ | Δ |
| Example 19 | 25 | 12.8 | 2300 | 300 | ○ | Δ |
| Example 20 | 10 | 10 | 2300 | 300 | ○ | Δ |
| Example 21 | 25 | 8.22 | 2300 | 300 | ○ | ○ |
| Example 22 | 3 | 12 | 2300 | 300 | ○ | Δ |
| Example 23 | 60 | 0.29 | 2300 | 300 | ○ | Δ |
| Example 24 | 125 | 0.11 | 2300 | 300 | ○ | Δ |
| Example 25 | 15 | 28 | 2300 | 300 | ○ | Δ |
| Example 26 | 25 | 5.1 | 1000 | 200 | ◎ | ◎ |
| Example 27 | 25 | 5.1 | 4000 | 200 | ◎ | ◎ |
| Example 28 | 25 | 5.1 | 1000 | 400 | ◎ | ◎ |
| Example 29 | 25 | 5.1 | 4000 | 400 | ◎ | ◎ |

TABLE 2

| | Preliminary Irradiation Conditions | | Complete Irradiation Conditions | | Matting Effect | |
|---|---|---|---|---|---|---|
| | Integrated Quantity of Light (E) mJ/cm$^2$ | Peak Intensity (Ip) mW/cm$^2$ | Integrated Quantity of Light (E1) mJ/cm$^2$ | Peak Intensity (Ip1) mW/cm$^2$ | Board-like article | 3D article |
| Comparison 1 | 32 | 12 | 2300 | 300 | X Matting effect | X There is |
| Comparison 2 | 6 | 2 | 2300 | 300 | X at specific | X variation in |
| Comparison 3 | 3.88 | 0.4 | 2300 | 300 | X portions is | X matting |
| Comparison 4 | 43 | 7 | 2300 | 300 | X weak | X according to |

TABLE 2-continued

| | Preliminary Irradiation Conditions | | Complete Irradiation Conditions | | Matting Effect | |
|---|---|---|---|---|---|---|
| | Integrated Quantity of Light (E) mJ/cm$^2$ | Peak Intensity (Ip) mW/cm$^2$ | Integrated Quantity of Light (E1) mJ/cm$^2$ | Peak Intensity (Ip1) mW/cm$^2$ | Board-like article | 3D article |
| Comparison 5 | 100 | 10 | 2300 | 300 | X | X surfacess |
| Comparison 6 | 75 | 3 | 2300 | 300 | X | X |
| Comparison 7 | 125 | 2.5 | 2300 | 300 | X | X |
| Comparison 8 | 40 | 9 | 2300 | 300 | X | X |
| Comparison 9 | 60 | 4 | 2300 | 300 | X | X |
| Comparison 10 | 35 | 14 | 2300 | 300 | X | X |
| Comparison 11 | 100 | 2 | 2300 | 300 | X | X |
| Comparison 12 | 12 | 0.9 | 2300 | 300 | X | X |
| Comparison 13 | 3 | 4 | 2300 | 300 | X | X |
| Comparison 14 | 40 | 0.1 | 2300 | 300 | X | X |
| Comparison 15 | 2 | 9 | 2300 | 300 | X | X |
| Comparison 16 | 23 | 0.2 | 2300 | 300 | X | X |
| Comparison 17 | 25 | 5.1 | 500 | 100 | No good because of partially semi-hardened state | |
| Comparison 18 | 25 | 5.1 | 6000 | 500 | No good of matting effect because of high gloss | |

The evaluation symbols on the visible estimation of the matting effect (state) of the decoration layer of the articles obtained by these Examples and Comparisons are as follows.

◎: a state where the good matting effect appeared on the decoration layer.

○: a state where the matting effect appeared on the decoration layer.

Δ: a state where the matting effect appeared on the decoration layer on the practically satisfactory degree although it was interior to that of ○.

X: a state where no matting effect appeared or where the matting effect is lower (a state where there was no design added value.

The hardening state of the coating film of the decoration layer after the complete irradiation was observed, the existence of faults such as hardening failure was visually inspected and what has the hardening state having a practical problem was estimated as no-good.

Example 1

In Example 1 of the invention was used the ultraviolet ray hardening resin composite of non-solvent type called the brand name "UVIC S CLEAR HE" manufactured by Ohashi Chemical Industries Ltd. in order to reproduce the adhesion of the ink of the transfer film. The adhesion of the ink of the transfer film having a wood grain pattern was reproduced by this ultraviolet ray hardening resin composite and the wood grain pattern of the transfer film was transferred under water pressure onto both of a plane board of ABS resin having a size of 10 cm×20 cm×3 mm and a three-dimensional article (a molding of approximately rectangular parallelepiped having a size of 100 mm×100 mm×thickness 50 mm) in the order of the steps shown in FIGS. 1A through 1G. The transfer film was formed by printing the wood grain pattern on the water-soluble film having a main ingredient of polyvinyl alcohol with the deep ink so that the linear late wood material portion of black or dark brown and early wood material portion of brown could be clearly expressed and commercially sold by the applicant (Taica Corporation) under the brand name called "ZEBRA LINE" to the applicant's licensees of the water pressure transfer art. The aforementioned ultraviolet ray hardening resin composite was applied on the print pattern of the transfer film by a wire bar coating method just before introducing the transfer film into the transfer tub. After floating the transfer film having the thus applied ultraviolet ray hardening resin composite of non-solvent type on the water surface of the transfer tub and reproducing the adhesion of the print pattern with the ultraviolet ray hardening resin composite, the articles were forced underwater through the transfer film as shown in FIG. 1C to thereby transfer the print pattern onto the articles under water pressure and then drawn out of the water. Thereafter, while the articles were conveying and moving on a belt conveyor belt into an ultraviolet ray hardening furnace, there were carried out the preliminary irradiation of ultraviolet ray with peak intensity of 0.75 [mW/cm$^2$] and integrated quantity of light of 125 [mJ/cm$^2$] using the high pressure mercury lamp (the high pressure mercury lamp HAK125NL-F manufactured by GS YUASA Power Supply Company) and then the complete irradiation of ultraviolet ray with peak intensity of 300 [mW/cm$^2$] and integrated quantity of light of 2300 [mJ/cm$^2$] using the A type metal halide lamp (the metal halide lamp MAN800NL manufactured by GS YUASA Power Supply Company) to thereby completely harden the decoration layer. Finally, the water washing step and the drying step were carried out to obtain the water pressure transfer article (product) 10'. Of course, the lamps for the preliminary irradiation and the complete irradiation were in the stationary state, respectively and the ultraviolet ray was irradiated the side faces and the upper face of the article.

Examples 2-25

As shown in Table 1, the water pressure transfer was performed in the manner identical to the method of Example 1 except to the preliminary irradiation conditions (the peak intensity and the integrated quantity of light) changed to thereby obtain the water pressure transfer article (product) 10'.

Examples 26-29

The water pressure transfer was performed in the manner identical to the method of Example 11 except to the complete irradiation conditions (the peak intensity and the integrated quantity of light) changed as shown in Table 1 to thereby obtain the water pressure transfer article (product) 10'.

Comparisons 1-16

As shown in Table 2, the water pressure transfer was performed in the manner identical to the method of Example 1 except to the preliminary irradiation conditions (the peak intensity and the integrated quantity of light) changed to thereby obtain the water pressure transfer article (product) 10'.

Comparisons 17-18

The water pressure transfer was performed in the manner identical to the method of Example 11 except to the complete irradiation conditions (the peak intensity and the integrated quantity of light) changed as shown in Table 1 to thereby obtain the water pressure transfer article (product) 10'

Evaluation of Examples and Comparisons

There are shown in Tables 1 and 2 the result of the evaluation of the aforementioned Examples and Comparisons 1 and 2. As noted from the result of the evaluations, the matting effect of Examples of the invention was most preferable, good or practically applicable without any trouble, but the matting effect of Comparisons had no design added value and therefore not practical.

Figure 5:
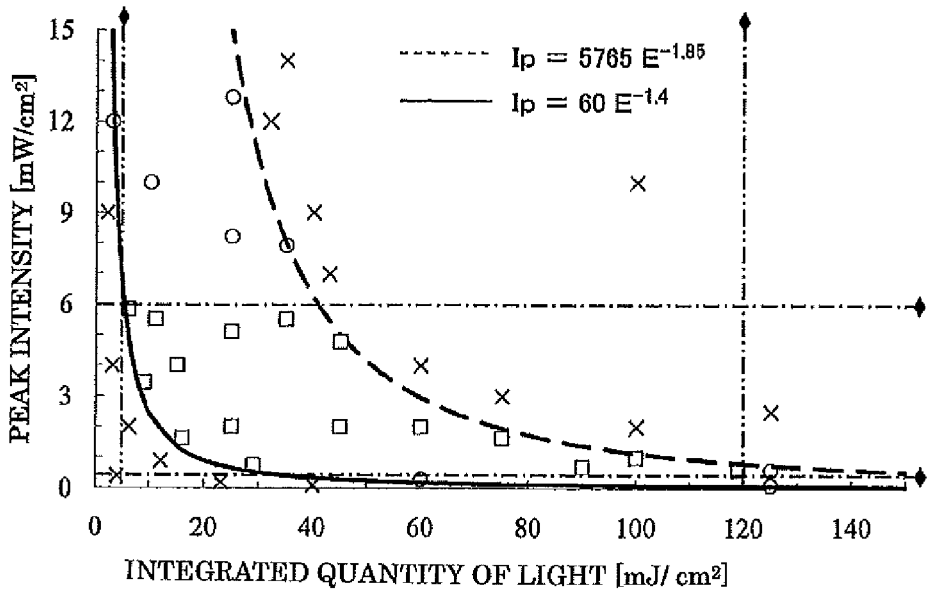
FIG. 5 is a graph showing the conditions of the preliminary irradiation conditions and the results of evaluation of the matting effect in Examples of the invention and Comparisons.

What the preliminary irradiation conditions of the aforementioned Examples and Comparisons are diagramed in accordance with FIG. 3 is shown in FIG. 5. In FIG. 5, a symbol "□" shows the irradiation conditions of Examples 1-16, a symbol "○" shows the irradiation conditions of Examples 17-24 and a symbol "X" shows the dot position of the irradiation conditions of Comparisons 1-16. As noted from FIG. 5, the condition area of each Example where the matting effect for the purpose of this invention is obtained exists within the preliminary irradiation condition of the invention. The desirable matting effect is obtained within the range of "$60E^{-1.4}<=Ip<=5765E^{-1.85}$", an area between the boundary condition curves (I) and (II) expressed by the expressions shown in FIG. 5. In particular, the good matting effect can be obtained under the conditions satisfying the peak intensity (Ip) of 0.5 or more [$mW/cm^2$] and 6 or less [$mW/cm^2$] and the integrated quantity of light (E) of 5 or more [$mJ/cm^2$] and 120 or less [$mJ/cm^2$]. On the other hand, when it falls out of the area, the matting effect got lower and in the case where the article is a three-dimensional article, there occurred the fault that the desired matting effect cannot be obtained on the sides of the article as described in the prior art.

Although not shown in Tables 1 and 2, if the complete irradiation conditions fall within the range of the complete irradiation conditions of the invention as shown in Examples of the invention, there occurs no fault of failure to harden the coat film, but if they fall out of the range of the complete irradiation conditions of the invention, there occurs the undesirable results such as the fault of failure to harden the coat film as shown in Comparisons 17 and 18 no provision of the matting effect due to high gloss.

Figure 6:
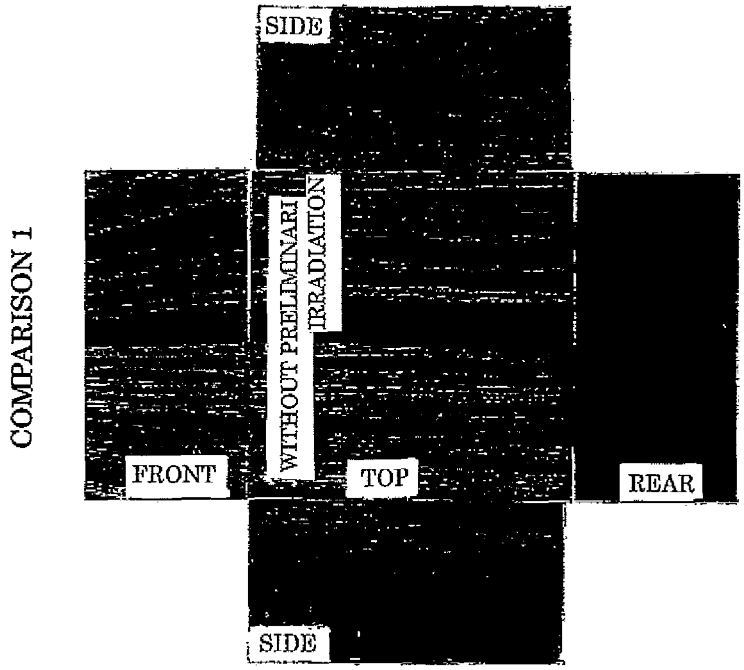
FIG. 6 shows the printed state of each of faces of the water pressure transfer article of rectangular parallelepiped obtained by the method of the invention when it is developed to the plane.
Figure 6:
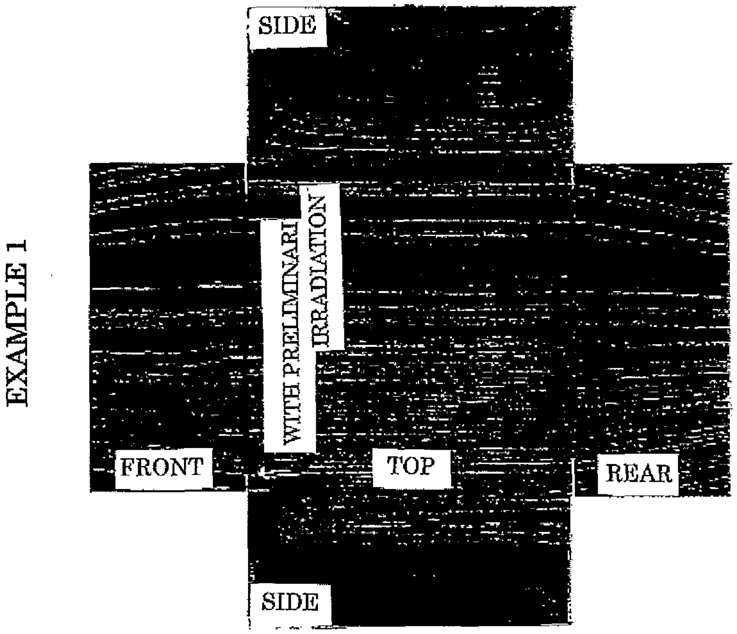

The printing state (matting effect) of the decoration layer of the three-dimensional article by Example 1 and Comparison 1 is shown in FIG. 6. In either of them, the three-dimensional articles conveyed by the conveyor start to enter the irradiation step from the top face (the central portion of the developed faces of FIG. 6) and the rear face (the lower face of the developed faces of FIG. 6) finally enters the irradiation step. Therefore, as the decoration layer of Example 1 is compared with that of Comparison 1, it will be noted that the gloss feeling of the decoration layer of Comparison 1 becomes higher than that of Example 1 as recognized visually and thus the matting effect of the decoration layer of Comparison 1 is lowered. This is caused by the surface layer portion Comparison 1 hardened without any formation of the fine unevenness due to variation in shrinkage (no formation and fixture of the fine unevenness due to variation in shrinkage on the surface layer portion) because Comparison 1 falls out of the range of the good preliminary irradiation conditions of the invention.

On the other hand, it will be noted that the product of Example 1 could obtain the totally stable matting effect by imparting the uniform matting effect to the deep portion of wood grain. Even if there was the difference of the degree, the products of Examples 1-25 had the matting effect uniform to the degree where it cannot be recognized visually, but the products of Comparisons 1-16 had the lack of uniformity of the matting effect to the degree where it could be wholly recognized visually. The invention forms and fixes the fine unevenness due to the previous shrinkage variation of only the surface layer portion by the preliminary irradiation of low permeability ultraviolet ray and this can control the matting effect f the design on the desired parts or the whole faces of the decoration layer in accordance with the degree of the preliminary irradiation.

Although not shown in Table 1, referring to the gloss degree (the value measured by using the gloss degree meter "Gloss Meter Model GP-60" manufactured by TOKYO DENSHOKU Co., Ltd. according to "mirror surface gloss of method 3-60-degree" of Japanese Industrial Standards Z8741-1997 "method 3-60-degree specular surface gloss" conformity), the gloss degree of the low gloss pattern portion (line-like late wood portion of black or dark brown) of the product of Examples 1-29 is generally less than 20 and the value of difference between the high gloss pattern portion (early wood portion of brown) and the low gloss pattern portion is 10 or more. The value of the gloss degree and the value of difference of the gloss degree are gloss degrees desirable for design. Thus, these Examples can control the design of the desired part or the whole surface by adjusting the preliminary irradiation conditions and the complete irradiation conditions within the predetermined range while realizing the desirable gloss degree.

On the other hand, the products of Comparisons 1-18 of Table 2 had the gloss degree of the low gloss pattern portion and the difference between the gloss degrees of the high and low gloss pattern portions falling out of the aforementioned desirable range generally and this causes no good result of the matting effect to be obtained and in addition thereto no desirable appearance in design to be obtain.

INDUSTRIAL APPLICABILITY

According to this invention, after the ultraviolet ray hardening resin composite is applied on the print pattern of dry state of the transfer film and then the print pattern into which the ultraviolet ray hardening resin composite is permeated is transferred on the surface of the article to thereby form the decoration layer, the ultraviolet ray permeates only through the surface of the decoration layer by the preliminary irradiation of ultraviolet rays to form the surface height variation (unevenness) portion and thereafter the ultraviolet ray permeates through the total thickness of the decoration layer by the complete irradiation of ultraviolet ray to completely harden the decoration layer. Thus, the matting effect can be imparted to the decoration layer simultaneously with the water pressure transfer without any requirement of separate operation for an application of topcoat and the height of the surface height variation can be easily controlled by adjusting the irradiation conditions of ultraviolet ray for the preliminary irradiation with the result that industrial availability can be improved.

The invention claimed is:

1. A water pressure transfer method comprising the steps of reproducing an adhesion of a dried print pattern by coating an ultraviolet ray hardening resin composite including photo-polymerization monomer to permeate said ultraviolet ray hardening resin composite into said print pattern; thereafter transferring said print pattern under water pressure onto a surface of an article to form a decoration layer, and then irradiating an ultraviolet ray on said decoration layer to harden said decoration layer, characterized by further comprising the steps of:

performing a preliminary irradiation of an ultraviolet ray permeating only through a surface-side portion of said decoration layer before said decoration layer is hardened to form a fine surface height variation portion due to the shrinkage of ink on the surface of said ink print portion of said decoration layer, wherein said ultraviolet ray for said preliminary irradiation is a low permeability ultraviolet ray of 200 nm or more and less than 320 nm and said preliminary irradiation of ultraviolet ray is performed under the conditions where the peak intensity (Ip) [mW/cm$^2$]) and the integrated quantity of light (E) [mJ/cm$^2$]) are both greater than zero and satisfy the relationship $60E^{-1.4} <= Ip <= 5765E^{-1.85}$; and thereafter performing a complete irradiation of ultraviolet ray penetrating through the whole decoration layer in a direction of thickness of said decoration layer to completely harden the whole thickness of said decoration layer while said surface height variation portion is maintained, wherein said ultraviolet ray for said complete irradiation is a high permeability ultraviolet ray of 320 nm or more and less than 390 nm.

2. A water pressure transfer method as set forth in claim 1 and wherein said ultraviolet ray hardening resin composite includes photo-polymerization pre-polymer and said photo-polymerization pre-polymer is either one of acrylic oligomer, polyester oligomer, epoxy acrylate oligomer, urethane acrylate oligomer or an arbitrary combination of two or more of them.

3. A water pressure transfer method as set forth in claim 1 and wherein said preliminary irradiation is performed in the conditions satisfying the peak intensity (Ip) of 0.5 or more [mW/cm$^2$] and 6 or less [mW/cm$^2$] and the integrated quantity of light of 5 or more [mJ/cm$^2$] and 120 or less [mJ/cm$^2$].

4. A water pressure transfer method as set forth in claim 1 and wherein the complete irradiation of the ultraviolet ray is performed under the conditions where the peak intensity (Ip) of 200 or more [mW/cm$^2$] and 400 or less [mW/cm$^2$] and the integrated quantity of light (E) of 1000 or more [mJ/cm$^2$]) and 4000 or less [mJ/cm$^2$].

* * * * *